US009344619B2

(12) United States Patent
Shroff et al.

(10) Patent No.: US 9,344,619 B2
(45) Date of Patent: May 17, 2016

(54) METHOD AND APPARATUS FOR GENERATING AN ALL-IN-FOCUS IMAGE

(71) Applicant: QUALCOMM Incorporated, San Diego, CA (US)

(72) Inventors: Nitesh Shroff, San Diego, CA (US); Ramin Rezaiifar, Del Mar, CA (US); Piyush Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/471,416

(22) Filed: Aug. 28, 2014

(65) Prior Publication Data

US 2015/0062370 A1   Mar. 5, 2015

Related U.S. Application Data

(60) Provisional application No. 61/872,504, filed on Aug. 30, 2013.

(51) Int. Cl.
*H04N 5/232* (2006.01)
*G06T 5/00* (2006.01)
*G06T 7/00* (2006.01)
*H04N 5/222* (2006.01)

(52) U.S. Cl.
CPC ............ *H04N 5/23212* (2013.01); *G06T 5/003* (2013.01); *G06T 7/0051* (2013.01); *G06T 7/0069* (2013.01); *H04N 5/2226* (2013.01); *G06T 2200/21* (2013.01); *G06T 2207/10028* (2013.01)

(58) Field of Classification Search
CPC .. H04N 5/23212; H04N 5/2226; G06T 5/003; G06T 7/0069; G06T 2207/10028
See application file for complete search history.

(56) References Cited

U.S. PATENT DOCUMENTS

| | | | |
|---|---|---|---|
| 7,711,259 B2 | 5/2010 | Daley | |
| 7,929,801 B2 | 4/2011 | Nakamura et al. | |
| 2007/0019883 A1 | 1/2007 | Wong et al. | |
| 2008/0013941 A1* | 1/2008 | Daley | G06T 5/50 396/121 |
| 2009/0214079 A1* | 8/2009 | Hamza | G06T 7/0044 382/103 |
| 2010/0165152 A1 | 7/2010 | Lim | |
| 2012/0070097 A1 | 3/2012 | Adams, Jr. | |
| 2012/0148109 A1* | 6/2012 | Kawamura | G01C 3/06 382/106 |
| 2013/0044254 A1 | 2/2013 | Tzur | |
| 2013/0063571 A1 | 3/2013 | Ishii | |

(Continued)

OTHER PUBLICATIONS

Davis, H., "High Focal Range (HFR)," Published on Apr. 22, 2008, 1 page.

(Continued)

*Primary Examiner* — Christopher K Peterson
(74) *Attorney, Agent, or Firm* — Kilpatrick Townsend & Stockton LLP (57) ABSTRACT

Techniques are described for generating an all-in focus image with a capability to refocus. One example includes obtaining a first depth map associated with a plurality of captured images of a scene. The plurality of captured images may include images having different focal lengths. The method further includes obtaining a second depth map associated with the plurality of captured images, generating a composite image showing different portions of the scene in focus (based on the plurality of captured images and the first depth map), and generating a refocused image showing a selected portion of the scene in focus (based on the composite image and the second depth map).

30 Claims, 6 Drawing Sheets

(56) References Cited

U.S. PATENT DOCUMENTS

2013/0088489 A1* 4/2013 Schmeitz ............. H04N 5/2254
345/419
2014/0146999 A1* 5/2014 Zeng .................. H04N 5/23212
382/103
2014/0285623 A1* 9/2014 Bruls ...................... G06T 5/002
348/43

2015/0109513 A1* 4/2015 Nayar ................ H04N 5/23212
348/349

OTHER PUBLICATIONS

International Search Report and Written Opinion—PCT/US2014/053583—ISA/EPO—Dec. 15, 2014.

* cited by examiner

METHOD AND APPARATUS FOR GENERATING AN ALL-IN-FOCUS IMAGE

CROSS-REFERENCE TO RELATED APPLICATIONS

The present application claims priority to Provisional Application No. 61/872,504 entitled "Method and Apparatus for Generating an All-in-Focus Image," filed Aug. 30, 2013, which is assigned to the assignee hereof and expressly incorporated by reference herein.

TECHNICAL FIELD

The present disclosure relates generally to capturing and processing digital images, and in particular, to generating an all-in-focus image with capability to refocus.

BACKGROUND

In photography, depending on the distance of different objects in a scene from the camera, some of the objects might appear in focus, while other objects appear out of focus or blur. This is due to the fact that in most vision systems, each image is captured with a particular "focal length." The "focal length" refers to a distance extending radially from the camera into the scene of the image. Any object in the image that is located exactly at the focal length appears perfectly in focus. On the other hand, any object that is not located at the focal length (e.g., closer to or farther away from the camera) appears blurry and out of focus. Different objects in any given scene may be located at different distances from the camera, therefore, it is likely that only some of the objects are located at perfect focus. Consequently, for a typical image captured by a visual system, some objects appear in focus in the image, while other objects appear out of focus.

Even though human vision systems generate images with similar characteristics, e.g., in any given image, only objects located at the focal length are in focus while other objects are blurry, humans are adapted to quickly scanning a scene, focusing on different objects, and obtaining a useful "composite" visual conception of the physical surroundings. That is how we "see" the world. However, when we look at captured images, e.g., an image on a display device, the same natural scanning and re-focusing generally is not available. Instead, we are often looking at a static image at any given time, with certain objects being in focus in the image, and certain other objects being blurry or out of focus in the image. To address these shortcomings, the present disclosure presents embodiments for realizing two different approaches to viewing images. One approach involves generating an "all-in-focus" image in which all objects are in focus. Another approach involves providing a "refocus" capability by which a user can select a portion of the image and bring it into focus.

SUMMARY

In one example, a method for image processing is disclosed. The method generally includes obtaining a plurality of images of a scene at differing focal lengths. Each image may show differing portions of the scene in focus. The method further includes, in part, obtaining a first depth map associated with the plurality of images and obtaining a second depth map associated with the plurality of images. The first depth map corresponds to a first neighborhood size and the second depth map corresponds to a second neighborhood size. In one aspect, the first neighborhood size is smaller than the second neighborhood size.

The method further includes, generating a composite image showing two or more portions of the scene in focus based on the plurality of images and the first depth map. In addition, the method includes generating a refocused image showing a selected portion of the scene in focus based on the composite image and the second depth map.

In one aspect, the method further includes filtering each of the plurality of captured images with a sharpness measuring filter to generate a plurality of filtered images. In one aspect, the sharpness measuring filter is a Laplacian filter.

In one aspect, obtaining the first depth map may include applying a first two-dimensional pixel function based on the first neighborhood size to each image in the plurality of filtered images to generate a first plurality depth images. Similarly, obtaining the second depth map may include applying a second two-dimensional pixel function based on the second neighborhood size to each image in the plurality of filtered images to generate a second plurality of depth images.

In one aspect, the first two-dimensional pixel function involves calculating a weighted average among depth values corresponding to a plurality of pixels in the first neighborhood. In another aspect, the first two-dimensional pixel function involves carrying out a weighted voting scheme on depth values corresponding to pixels in the first neighborhood.

In one aspect, obtaining the first depth map includes, in part, obtaining a maximum depth value among a first plurality of depth values corresponding to the first plurality of depth images for each pixel position. Similarly, obtaining the second depth map includes, in part, obtaining a maximum depth value among a second plurality of depth values corresponding to the second plurality of depth images for each pixel position.

In one aspect, the differing focal lengths of the plurality of images are uniformly distributed between a minimum focal length value and a maximum focal length value.

In one aspect, the second depth map is generated on the fly based on the first depth map. For example, the second depth map may be generated by applying a weighted average, a weighted voting scheme or any other selection scheme to depth values in the first depth map corresponding to multiple pixels in the second neighborhood.

Moreover, certain aspects provide an apparatus for image processing. The apparatus generally includes means for means for obtaining a plurality of images of a scene at differing focal lengths. Each image shows differing portions of the scene in focus. The apparatus further includes means for obtaining a first depth map associated with the plurality of images, means for obtaining a second depth map associated with the plurality of images, means for generating a composite image showing two or more portions of the scene in focus based on the plurality of images and the first depth map, and means for generating a refocused image showing a selected portion of the scene in focus based on the composite image and the second depth map. In one aspect, the first depth map corresponds to a first neighborhood size and the second depth map corresponds to a second neighborhood size.

Certain aspects provide a non-transitory processor-readable medium for image processing. The processor readable medium includes, in part, processor-readable instructions configured to cause a processor to obtain a plurality of images of a scene at differing focal lengths. Each image shows differing portions of the scene in focus. The instruction are further configured to cause the processor to obtain a first depth map associated with the plurality of images, obtain a second depth map associated with the plurality of images, generate a composite image showing two or more portions of the scene in focus based on the plurality of images and the first depth map, and generate a refocused image showing a selected portion of the scene in focus based on the composite image and the second depth map. In one aspect, the first depth map corresponds to a first neighborhood size and the second depth map corresponds to a second neighborhood size.

Certain aspects provide an apparatus for image processing. The apparatus includes, in part, at least one processor and a memory coupled to the at least one processor. The at least one processor is configured to obtain a plurality of images of a scene at differing focal lengths. Each image shows differing portions of the scene in focus. The at least one processor is further configured to obtain a first depth map associated with the plurality of images, obtain a second depth map associated with the plurality of images, generate a composite image showing two or more portions of the scene in focus based on the plurality of images and the first depth map, and generate a refocused image showing a selected portion of the scene in focus based on the composite image and the second depth map. The first depth map corresponds to a first neighborhood size and the second depth map corresponds to a second neighborhood size.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments present a method for generating an image with extended depth-of-field along with the capability to refocus later at a desired part of the image. Depth-of-field usually refers to the distance between the nearest and farthest objects in a scene that appear acceptably sharp in the image. Although a lens can precisely focus at only one distance (e.g., the focal length) at a time, the decrease in sharpness may be gradual on each side of the focused distance, so that within the depth of field, the un-sharpness is imperceptible under normal viewing conditions. In general, focal length refers to the distance between an object and the camera in which the object appears in focus in the image.

One embodiment uses two or more images with different focal lengths (hereinafter called the focal stack images) and processes these focal stack images to generate a composite image. Most or all of the objects in the composite image may appear in focus (e.g., an all-in-focus image).

As described herein, by combining two or more images with different focal lengths, depth of field of a composite image may be extended to be larger than the depth of field of each of the individual images. Therefore, objects that are relatively far from each other may appear in-focus in the composite image.

A user usually focuses on different objects in a scene by changing the focal length of a camera. For example, in a scene that has two objects with different distances from the camera (e.g., a person that is close to the camera, and a building faraway in the background). A first image may be taken with a first focal length in which the person appears in focus while the building appears out of focus. In addition, a second image may be taken from the same scene with a second focal length in which the building appears in focus while the person appears out of focus. Certain embodiments propose a method to combine these images (that are taken with different focal lengths) to generate a composite image in which almost all of the objects appear in focus. In the above example, both the person and the building may appear in focus in the composite image. In addition, in one embodiment, the composite image may have embedded information that can be used to refocus at a desired portion of the image at a later time.

Current techniques used in the art for merging images typically use a single depth map for both refocusing and computing the all-in-focus image. Some of these techniques use hardware-based solutions to capture the light-field to enable refocusing capability. Certain embodiments of the present disclosure generate two different depth maps (e.g., masks), a first depth map may be used for generating the all-in-focus image and a second depth map may be used for refocusing.

Figure 1:
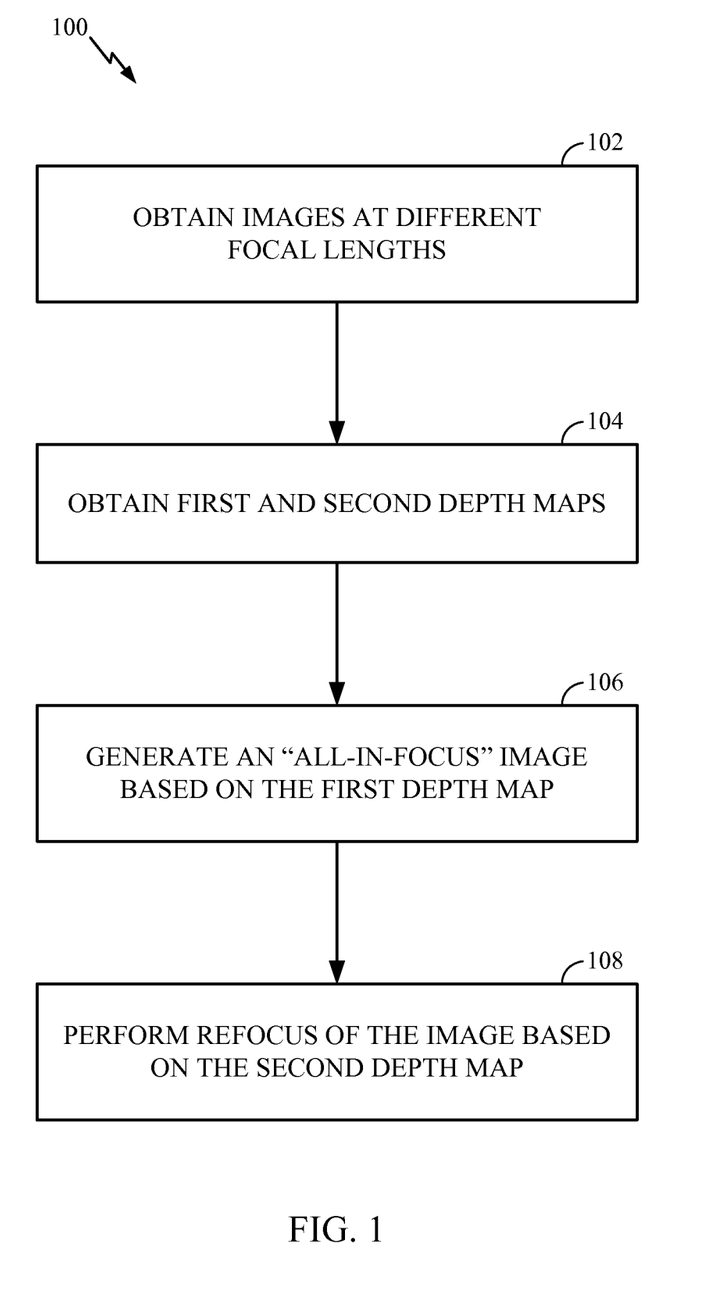
FIG. 1 illustrates an example high level block diagram of a device that is capable of capturing and/or processing images, in accordance with certain embodiments of the present disclosure.

FIG. 1 illustrates an example high-level block diagram of an image capturing and/or processing device 100, in accordance with certain embodiments of the present disclosure. In one embodiment, the device may use an embedded camera to capture one or more images. In another embodiment, the device may receive images from another image capturing device. In yet another embodiment, the device may capture some of the images using its embedded camera and receive one or more images from other image capturing devices. In general, the device may be a mobile phone, a tablet, a laptop, head mount display (HMD), a camera, or any other type of fixed or mobile devices capable of capturing and/or processing images.

As illustrated, in block 102, the device may capture and/or obtain two or more images with at least two different focal lengths. The device may then store the images and process the images to obtain a first depth map and a second depth map (block 104). The device may generate an all-in-focus image based on the first depth map (block 106). The device may also refocus on a portion of the image using the second depth map (block 108).

Figure 2:
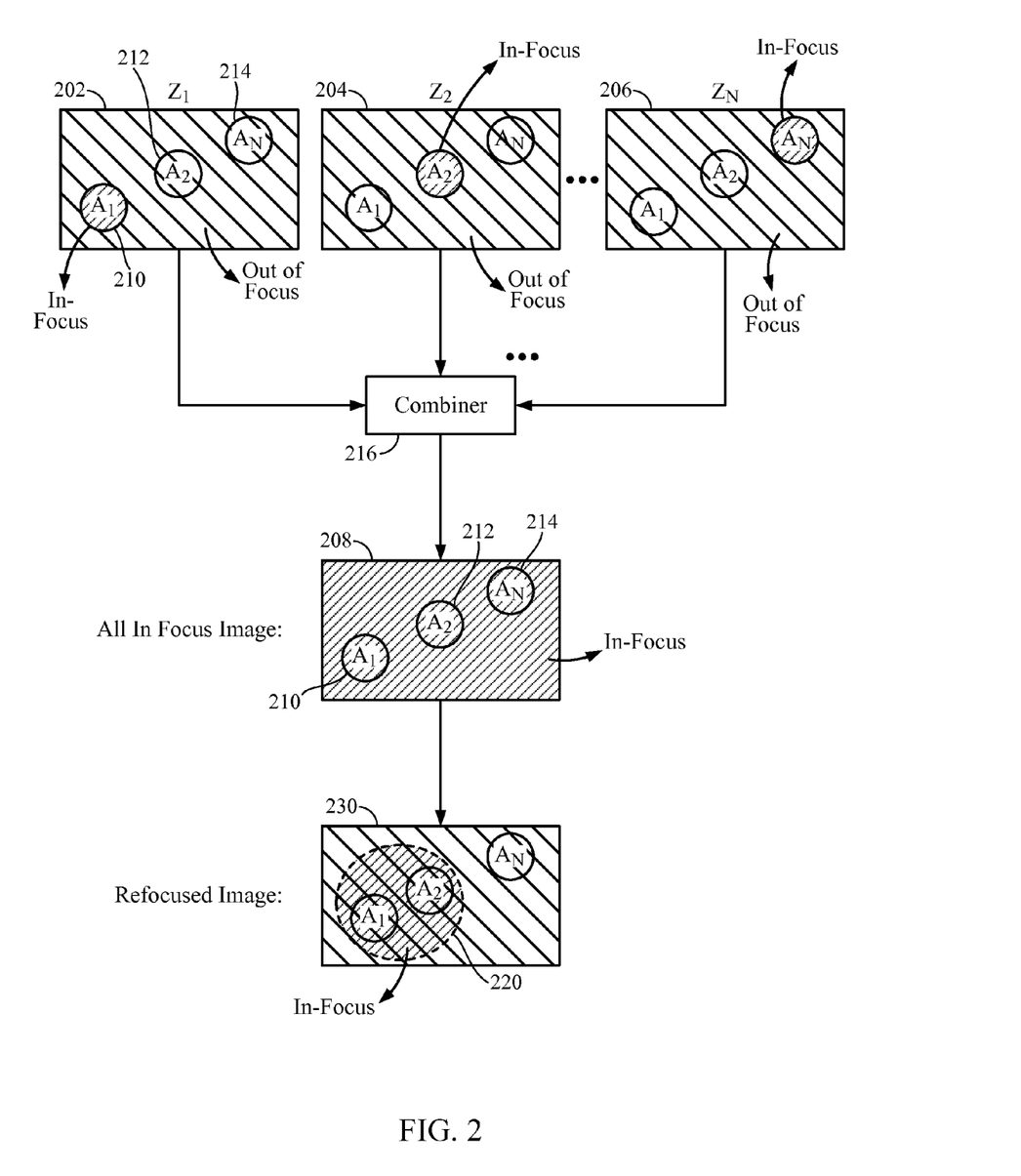
FIG. 2 illustrates an example image combining method, in accordance with certain embodiments of the present disclosure.

FIG. 2 illustrates an example image combining method, in accordance with certain embodiments of the present disclosure. As illustrated, a stack of images $Z_1$ 202, $Z_2$ 204, ..., $Z_N$ 206 may be obtained by a device. As an example, the device may have a camera and capture the images itself, or the device may receive the images from another source. Each of the images $Z_1$ through $Z_N$ may have a different focal length. Therefore in each image, some sections appear in focus, while other sections are out of focus. For example, in image $Z_1$ 202, section $A_1$ 210 is in focus, while other parts are out of focus. Similarly, in image $Z_2$ 204, section $A_2$ 212 appears in focus, and in image $Z_3$ 206, section $A_N$ 214 appears in focus, while other parts appear out of focus.

The image combiner 216 combines the stack of images $Z_1$, $Z_2, \ldots, Z_N$ according to the teachings herein to generate an all in focus image 208, in which most or all the sections appear in focus. A refocused image 230 may also be generated from the all-in-focus image in which the image is re-focused on section 220. Other sections may or may not appear out of focus in the refocused image 230.

In one embodiment, the focal stack images (e.g., $Z_1$ through $Z_N$) may have two or more different focal lengths. In one embodiment, the focal lengths may be distributed uniformly between a predetermined minimum and maximum focal length values. In general, focal lengths of different images may be selected randomly, based on a predefined distribution, or based on properties of different objects in the scene without departing from the teachings of the present disclosure.

Figure 3:
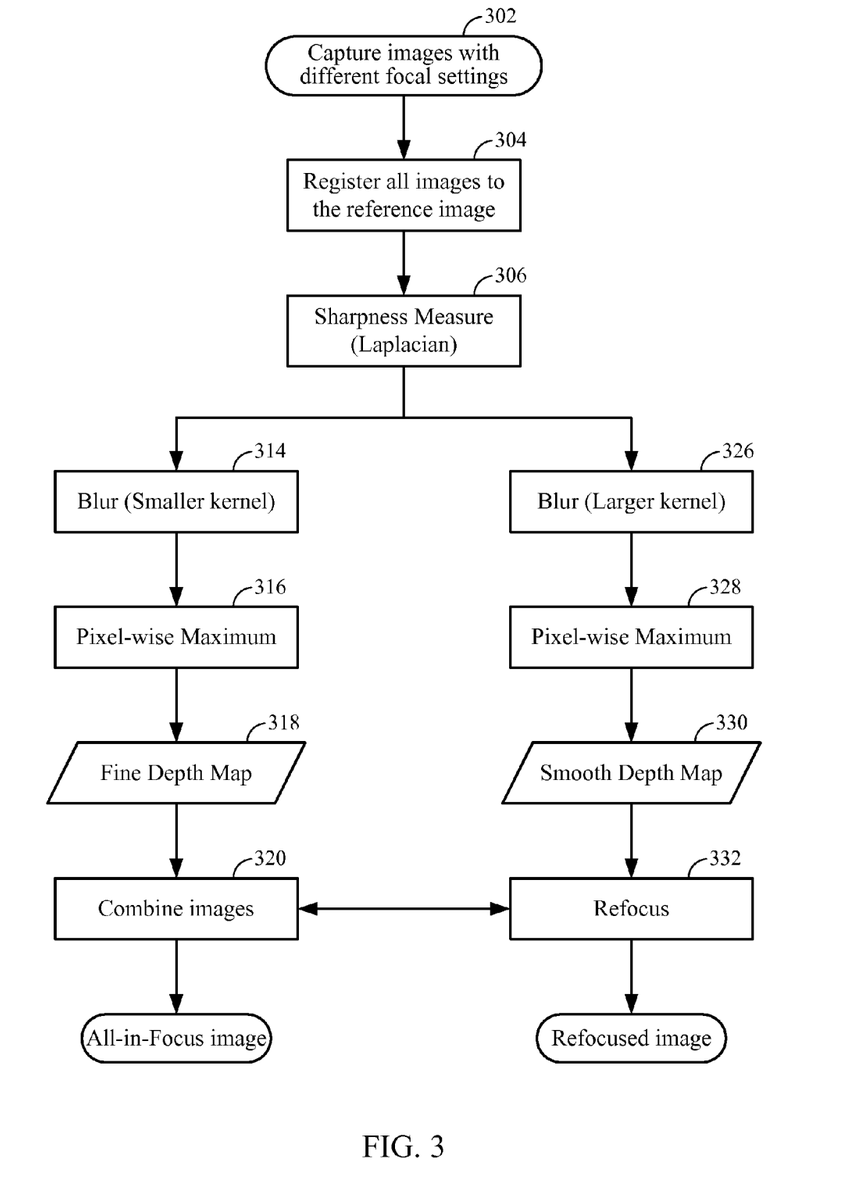
FIG. 3 illustrates an example block diagram of an image combining method, in accordance with certain embodiments of the present disclosure.

FIG. 3 illustrates an example block diagram 300 of the image generation method, according to one embodiment. At 302, a device may capture two or more images with different focal settings. In one embodiment, the device may receive the two or more images from another device. At 304, the device may register all the images to a reference image. Without loss of generality, it is assumed that each of the images have at least some overlap with the reference image. For example, the reference image may show a person, a building and a tree among other things. One of the two or more images may show the person and the tree, in which the person appears in focus. Another image may show the building and the tree, in which the building appears in focus. Yet another image may show the person, the tree and the building, in which the tree appears in focus. By registering the two or more images to the reference image, overlap between images may be determined. In general, any one of the images may be considered the reference image without departing from the teachings of the present disclosure. In addition, for simplicity of discussion, it may be assumed that all the images are taken from the same scene and fully overlap.

At 306, the device may pass the images through a sharpness measuring filter 306 (e.g., a Laplacian filter). The Laplacian filter is a two-dimensional isotropic measure of the second spatial derivative of an image. The Laplacian filter highlights regions of rapid intensity change in the image, and is often used for edge detection. In general, the Laplacian filter or any other sharpness measuring filters may be used without departing from the teachings of the present disclosure.

At 314, the images may be blurred using a small kernel (e.g., corresponding to a small neighborhood around a pixel in each image). Blurring refers to the process of reducing sharpness of an image. In general, blurring may be used to reduce image noise and/or high frequency components in the image. Several methods exist in the art for blurring an image (e.g., Gaussian blur, selective blur, etc.). As an example, in Gaussian blur, a Gaussian function is convolved with the image to blur the image. In case of a two-dimensional (2-D) image, a 2-D Gaussian function (e.g., product of two 1-D Gaussian functions, one in each dimension) may be convolved with values of different pixels in the image.

At 316, to generate a fine depth map ($D_{AIF}$, 318), depth values corresponding to each pixel in each of the blurred images are compared. The fine depth map $D_{AIF}$ may correspond to the maximum depth value for each pixel in most or all of the blurred images. For example, a maximum depth value for each pixel (i,j) in the image may be determined by comparing the depth values of the corresponding pixels in the blurred images. In one embodiment, the maximum depth value may be determined for each pixel. In another embodiment, the maximum depth value may be determined within a predefined neighborhood around a pixel (e.g., a 3×3 matrix around a pixel). At 320, the images may be combined using the fine depth map $D_{AIF}$ to generate an all-in-focus image.

In addition, at 326, another blurring operation with a larger neighborhood size (e.g., a larger kernel) may be performed on the result of the sharpness measuring filter 312 to generate a second set of blurred images. At 328, a pixel-wise maximum operation may be performed on the second set of blurred images to generate a smooth depth map $D_{RF}$ 330. At 332, refocusing operation may be performed on the image (e.g., the all-in-focus image) based on the smooth depth map $D_{RF}$ to generate a refocused image.

In one embodiment, the all-in-focus image may be generated using the following procedure. The focal stack images may be represented by $Z_1, Z_2, \ldots, Z_N$, in which $Z_i$ represents an image. The images may have red-green-blue (RGB), grayscale, or any other format. Each image ($Z_i$) may be convolved with a sharpness-measuring filter (e.g., a Laplacian filter) to generate output images $Y_i$, as follows:

$$Y_i = \text{Laplacian}(Z_i).$$

In one embodiment, information corresponding to a plurality of pixels in vicinity of the pixel of interest may be considered while generating a depth map. Using information from other pixels in the neighborhood reduces impact of noise and ensures local consistency. As an example, information corresponding to other pixels that are within a predefined neighborhood may be averaged and considered in the calculations. In another embodiment, a weighted voting scheme on the pixels in the neighborhood may be considered. Without loss of generality, it may be assumed that the neighborhood is a circle with a radius of size S around a pixel, however, the neighborhood may have any other shape (e.g., rectangle, hexagon, and the like) without departing from the teachings of the present disclosure.

For certain embodiments, two different neighborhood sizes (e.g., $S_1$ and $S_2$) may be considered for generating the two depth maps. A first, small neighborhood size (e.g., $S_1$) may be used for generating the fine depth map. In addition, a second neighborhood size $S_2$ (e.g., $S_2 > S_1$) may be used for generating the smooth depth map. Selecting a small neighborhood size for generating the fine depth map may ensure sharpness of the all-in-focus image while ensuring local consistency. On the other hand, a large neighborhood size may be more suitable for refocusing (e.g., the smooth depth map), because users typically want to refocus on a region (e.g., an object) in the image, rather than a pixel. In addition, a larger neighborhood ensures that there are no abrupt refocusing changes in two nearby pixels on the same object. In one embodiment, size of the neighborhood used for generating the smooth depth map (e.g., $S_2$) may be three times larger than size of the neighborhood used for generating the fine depth map (e.g., $S_1$).

In one embodiment, a maximum depth value may be calculated across a neighborhood in each of the focal stack of images to generate the depth maps. For example, the fine depth map (e.g., $D_{AIF}$) for generating the all-in-focus image may be determined by calculating a maximum depth value across a neighborhood of size $S_1$ in the focal stack of images. Similarly, the smooth depth map (e.g., $D_{RF}$) for generating the refocused image may be determined by calculating a maximum depth value across a neighborhood of size $S_2$ in the focal stack of images.

In one embodiment, the smooth depth map $D_{RF}$ corresponding to the image (or a portion of the image) may be calculated on-the-fly based on the fine depth map $D_{AIF}$. For example, when a user selects a pixel to be refocused on (e.g., by touching the pixel on a screen or any other means), values of $D_{AIF}$ in a large neighborhood around the selected pixel may be considered. A voting scheme (or a weighted voting scheme, or any other selection scheme) may then be applied to the fine depth values corresponding to multiple pixels in the large neighborhood around the selected pixel. The value corresponding to an index with maximum vote may be selected as the smooth depth value corresponding to the selected pixel. The same process may be repeated for most or all of the pixels in the image to generate the smooth depth map $D_{RF}$. The smooth depth map may then be used to refocus on a selected portion of the image.

As an example, to generate smooth depth value corresponding to a pixel (i,j), a neighborhood of size n×m around the pixel may be considered. The smooth depth value corresponding to the pixel (i,j) may be calculated based on the fine depth values corresponding to each of the pixels in the selected neighborhood. In one example, the fine depth values may be combined based on a voting scheme to generate a smooth depth value corresponding to the pixel (i,j). For example, in a neighborhood of size n×m pixels, out of the K=n×m fine depth values, $K_1$ values may be equal to α, $K_2$ values may be equal to β and $K_3$ values may be equal to γ. Without loss of generality, it may be assumed that $K_1 > K_2 > K_3$. In one example, the value α may be considered as the smooth depth value corresponding to the pixel (i,j) (e.g., the value with highest number of repetition or votes). In another example, the smooth depth map may be calculated based on a weighted average of the values α, β, and γ. It should be noted that any other scheme may be used to obtain a smooth depth value and/or a smooth depth map without departing from the teachings of the present disclosure.

Figure 4:
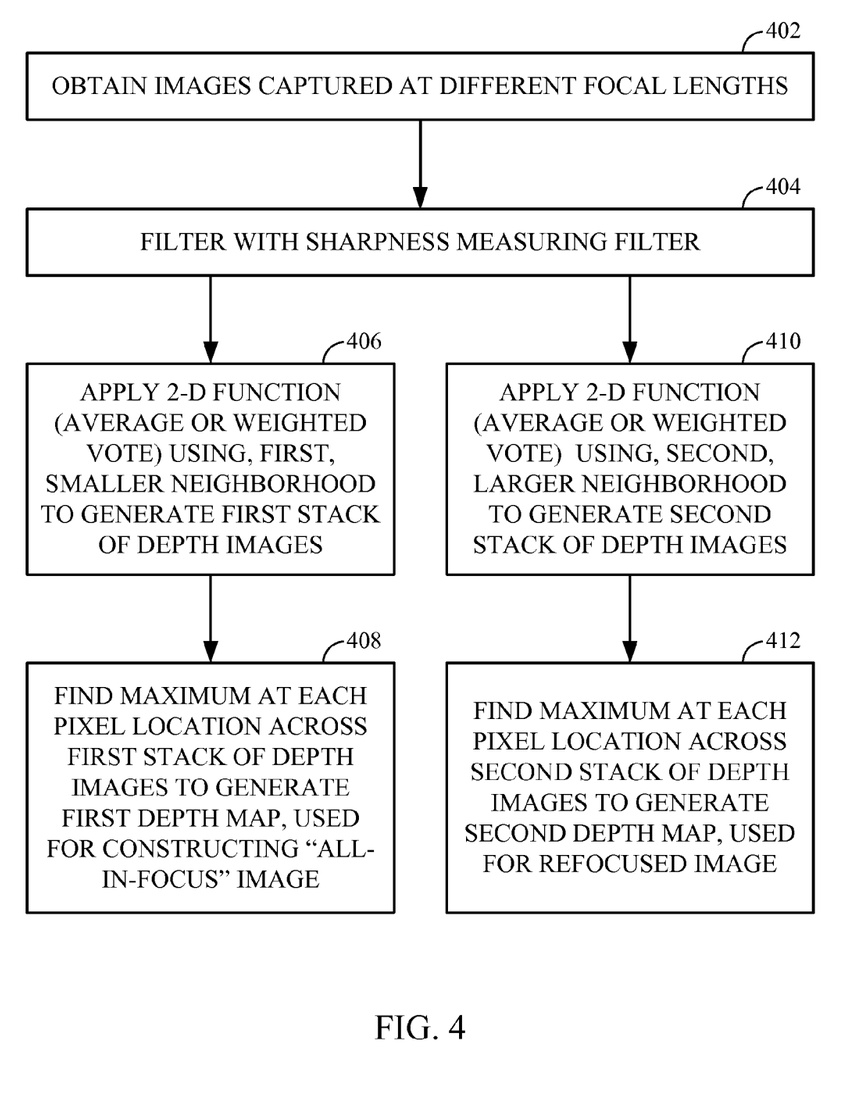
FIG. 4 illustrates example operations that may be performed by a device to combine a plurality of images, in accordance with certain embodiments of the present disclosure.

FIG. 4 illustrates example operations that may be performed by a device to generate an image, in accordance with certain embodiments of the present disclosure. At 402, the device may obtain (e.g., capture or receive from an image capturing device) images at different focal lengths. At 404, the device may filter the images with sharpness measuring filter (e.g., a Laplacian filter). At 406, the device may apply a two-dimensional function to each of the images, to generate a first stack of depth images. In one embodiment, the 2-D function may use a first, smaller neighborhood. As an example, the first stack of depth images may be generated by convolving a 2-D Gaussian blurring function corresponding to a small neighborhood with each of the images. In another embodiment, each of the depth images may be generated by performing a weighted average among the depth values corresponding to multiple pixels located in the small neighborhood around each pixel in the image.

At 408, the device may find a maximum depth value at each pixel location across the first stack of depth images to generate a first depth map, used for constructing the composite, "all-in-focus" image. In one embodiment, the device may use a weighted voting scheme to generate the first depth map. In yet another embodiment, the device may calculate a weighted average of the depth values to generate the first depth map.

Any other scheme may be used to generate the first depth map without departing from the teachings of the present disclosure.

As an example, the stack of depth images may include three images $Z_1$, $Z_2$, and $Z_3$, each captured with a different focal length. Pixel (i,j) in image $Z_1$ may correspond to depth value α, pixel (i,j) in image $Z_2$ may correspond to depth value β, and pixel (i,j) in image $Z_3$ may correspond to depth value γ. $D_{AIF}$ corresponding to this pixel may be calculated as max(α, β, γ).

Moreover, at 410, the device may apply a two-dimensional function to each of the captured images using a second, larger neighborhood, to generate a second stack of depth images. As an example, the second stack of depth images may be generated by convolving a 2-D Gaussian blurring function corresponding to a large neighborhood with each of the images.

At 412, the device may find maximum at each pixel location across second stack of depth images to generate second depth map, used for constructing a "refocused" image. In one embodiment, the two-dimensional pixel function may involve obtaining an average of depth values corresponding to neighboring pixels and/or carrying out a weighted voting scheme among depth values corresponding to the neighboring pixels.

Figure 5A:
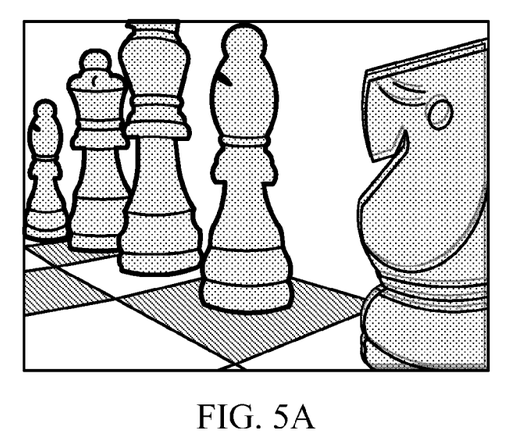
FIGS. 5A-5C illustrate example images that are combined using the image combining method, in accordance with certain embodiments of the present disclosure.
Figure 5B:
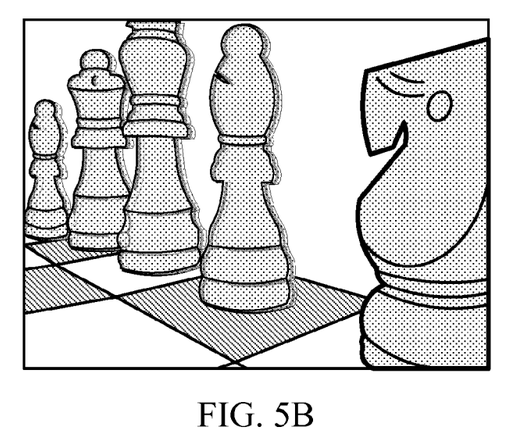
Figure 5C:
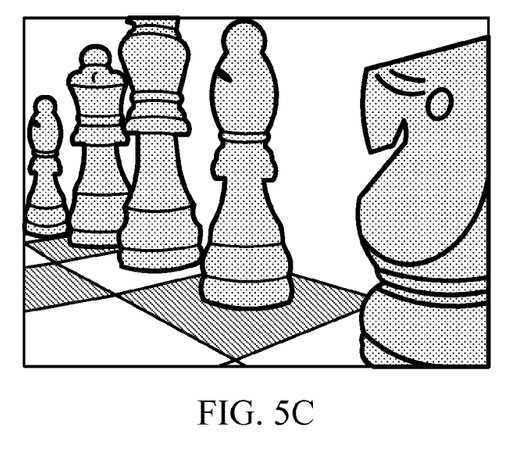

FIGS. 5A through 5C illustrate example images that are generated using the proposed scheme, in accordance with certain embodiments of the present disclosure. FIGS. 5A and 5B illustrate two input images, each of which with a different focal length. FIG. 5C illustrates an all-in-focus image that is generated using the proposed scheme. As can be seen from the images, in each of the FIGS. 5A and 5B, parts of the image appear in-focus while other parts appear out-of-focus. In the composite image of FIG. 5C, all of the image appears sharp and in-focus. The composite image is generated using the fine depth map $D_{AIF}$. If a user wants to refocus on a portion of the composite image shown in FIG. 5C, the user may use the smooth depth map $D_{RF}$.

Figure 6:
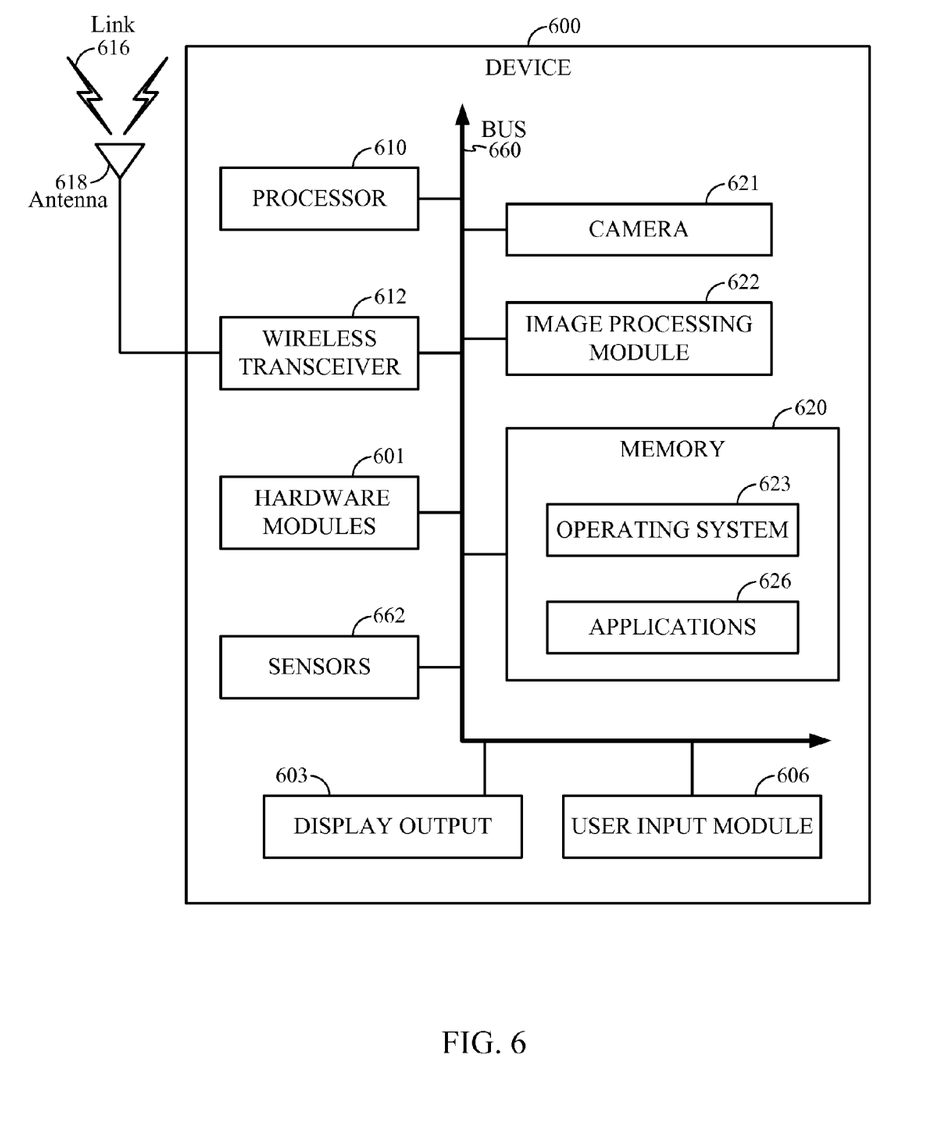
FIG. 6 describes one potential implementation of a device which may be used to generate an image, in accordance with certain embodiments of the present disclosure.

FIG. 6 describes one potential implementation of a device which may be used to combine images, according to certain embodiments. In one embodiment, device 600 may be implemented with the specifically described details of process 400. In one embodiment, specialized modules such as camera 621 and image processing module 622 may include functionality needed to capture and process images according to the method. The camera 621 and image processing modules 622 may be implemented to interact with various other modules of device 600. For example, the combined image may be output on display output 603. In addition, the image processing module may be controlled via user inputs from user input module 606. User input module 606 may accept inputs to define a user preferences regarding the combined image. Memory 620 may be configured to store images, and may also store settings and instructions that determine how the camera and the device operate.

In the embodiment shown at FIG. 6, the device may be a mobile device and include processor 610 configured to execute instructions for performing operations at a number of components and can be, for example, a general-purpose processor or microprocessor suitable for implementation within a portable electronic device. Processor 610 may thus implement any or all of the specific steps for operating a camera and image processing module as described herein. Processor 610 is communicatively coupled with a plurality of components within mobile device 600. To realize this communicative coupling, processor 610 may communicate with the other illustrated components across a bus 660. Bus 660 can be any subsystem adapted to transfer data within mobile device 600.

Bus 660 can be a plurality of computer buses and include additional circuitry to transfer data.

Memory 620 may be coupled to processor 610. In some embodiments, memory 620 offers both short-term and long-term storage and may in fact be divided into several units. Short term memory may store images which may be discarded after an analysis. Alternatively, all images may be stored in long term storage depending on user selections. Memory 620 may be volatile, such as static random access memory (SRAM) and/or dynamic random access memory (DRAM) and/or non-volatile, such as read-only memory (ROM), flash memory, and the like. Furthermore, memory 620 can include removable storage devices, such as secure digital (SD) cards. Thus, memory 620 provides storage of computer readable instructions, data structures, program modules, and other data for mobile device 600. In some embodiments, memory 620 may be distributed into different hardware modules.

In some embodiments, memory 620 stores a plurality of applications 626. Applications 626 contain particular instructions to be executed by processor 610. In alternative embodiments, other hardware modules may additionally execute certain applications or parts of applications. Memory 620 may be used to store computer readable instructions for modules that implement scanning according to certain embodiments, and may also store compact object representations as part of a database.

In some embodiments, memory 620 includes an operating system 623. Operating system 623 may be operable to initiate the execution of the instructions provided by application modules and/or manage other hardware modules as well as interfaces with communication modules which may use wireless transceiver 612 and a link 616. Operating system 623 may be adapted to perform other operations across the components of mobile device 600, including threading, resource management, data storage control and other similar functionality.

In some embodiments, mobile device 600 includes a plurality of other hardware modules 601. Each of the other hardware modules 601 is a physical module within mobile device 600. However, while each of the hardware modules 601 is permanently configured as a structure, a respective one of hardware modules may be temporarily configured to perform specific functions or temporarily activated.

Other embodiments may include sensors integrated into device 600. An example of a sensor 662 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensors 662 may be implemented as hardware, software, or firmware. Further, as described herein, certain hardware modules such as the accelerometer, the GPS module, the gyroscope, the inertial sensor, or other such modules may be used in conjunction with the camera and image processing module to provide additional information. In certain embodiments, a user may use a user input module 606 to select how to analyze the images.

Mobile device 600 may include a component such as a wireless communication module which may integrate antenna 618 and wireless transceiver 612 with any other hardware, firmware, or software necessary for wireless communications. Such a wireless communication module may be configured to receive signals from various devices such as data sources via networks and access points such as a network access point. In certain embodiments, compact object representations may be communicated to server computers, other mobile devices, or other networked computing devices to be stored in a remote database and used by multiple other devices when the devices execute object recognition functionality In addition to other hardware modules and applications in memory 620, mobile device 600 may have a display output 603 and a user input module 606. Display output 603 graphically presents information from mobile device 600 to the user. This information may be derived from one or more application modules, one or more hardware modules, a combination thereof, or any other suitable means for resolving graphical content for the user (e.g., by operating system 623). Display output 603 can be liquid crystal display (LCD) technology, light emitting polymer display (LPD) technology, or some other display technology. In some embodiments, display module 603 is a capacitive or resistive touch screen and may be sensitive to haptic and/or tactile contact with a user. In such embodiments, the display output 603 can comprise a multi-touch-sensitive display. Display output 603 may then be used to display any number of outputs associated with a camera 621 or image processing module 622, such as alerts, settings, thresholds, user interfaces, or other such controls.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

It should be noted that the method as described herein may be implemented in software. The software may in general be stored in a non-transitory storage device (e.g., memory) and carried out by a processor (e.g., a general purpose processor, a digital signal processor, and the like.)

Having described several embodiments, it will therefore be clear to a person of ordinary skill that various modifications, alternative constructions, and equivalents may be used without departing from the spirit of the disclosure.

What is claimed is:

1. A method for image processing, comprising:
    obtaining a plurality of images of a scene at differing focal lengths, wherein each image shows differing portions of the scene in focus;
    obtaining a first depth map associated with the plurality of images;
    obtaining a second depth map associated with the plurality of images, wherein the first depth map corresponds to a first neighborhood size and the second depth map corresponds to a second neighborhood size;
    generating a composite image showing two or more portions of the scene in focus, based on the plurality of images and the first depth map; and
    generating a refocused image showing a selected portion of the scene in focus, based on the composite image and the second depth map.

2. The method of claim 1, wherein the first neighborhood size is smaller than the second neighborhood size.

3. The method of claim 1, further comprising:
    filtering each of the plurality of captured images with a sharpness measuring filter, to generate a plurality of filtered images;
    wherein obtaining the first depth map comprises:
        applying a first two-dimensional pixel function based on the first neighborhood size to each image in the plurality of filtered images, to produce a first plurality depth images;
    wherein obtaining the second depth map comprises:
        applying a second two-dimensional pixel function based on the second neighborhood size to each image in the plurality of filtered images, to produce a second plurality of depth images.

4. The method of claim 3, wherein the first two-dimensional pixel function involves calculating a weighted average among depth values corresponding to a plurality of pixels in the first neighborhood.

5. The method of claim 3, wherein the first two-dimensional pixel function involves carrying out a weighted voting scheme on depth values corresponding to pixels in the first neighborhood.

6. The method of claim 3, wherein the sharpness measuring filter is a Laplacian filter.

7. The method of claim 3,
    wherein obtaining the first depth map comprises:
        obtaining a maximum depth value among a first plurality of depth values corresponding to the first plurality of depth images for each pixel position; and
    wherein obtaining the second depth map comprises:
        obtaining a maximum depth value among a second plurality of depth values corresponding to the second plurality of depth images for each pixel position.

8. The method of claim 1, wherein the differing focal lengths of the plurality of images are uniformly distributed between a minimum focal length value and a maximum focal length value.

9. The method of claim 1, wherein the second depth map is generated on the fly based on the first depth map.

10. An apparatus for image processing, comprising:
    means for obtaining a plurality of images of a scene at differing focal lengths, wherein each image shows differing portions of the scene in focus;
    means for obtaining a first depth map associated with the plurality of images;
    means for obtaining a second depth map associated with the plurality of images, wherein the first depth map corresponds to a first neighborhood size and the second depth map corresponds to a second neighborhood size;
    means for generating a composite image showing two or more portions of the scene in focus, based on the plurality of images and the first depth map; and
    means for generating a refocused image showing a selected portion of the scene in focus, based on the composite image and the second depth map.

11. The apparatus of claim 10, wherein the first neighborhood size is smaller than the second neighborhood size.

12. The apparatus of claim 10, further comprising:
    means for filtering each of the plurality of captured images with a sharpness measuring filter, to generate a plurality of filtered images;
    wherein the means for obtaining the first depth map comprises:
        means for applying a first two-dimensional pixel function based on the first neighborhood size to each image in the plurality of filtered images, to produce a first plurality depth images;
    wherein the means for obtaining the second depth map comprises:
        means for applying a second two-dimensional pixel function based on the second neighborhood size to each image in the plurality of filtered images, to produce a second plurality of depth images.

13. The apparatus of claim 12, wherein the first two-dimensional pixel function involves calculating a weighted average among depth values corresponding to a plurality of pixels in the first neighborhood.

14. The apparatus of claim 12, wherein the first two-dimensional pixel function involves carrying out a weighted voting scheme on depth values corresponding to pixels in the first neighborhood.

15. The apparatus of claim 12,
    wherein the means for obtaining the first depth map comprises:
        means for obtaining a maximum depth value among a first plurality of depth values corresponding to the first plurality of depth images for each pixel position; and
    wherein the means for obtaining the second depth map comprises:
        means for obtaining a maximum depth value among a second plurality of depth values corresponding to the second plurality of depth images for each pixel position.

16. The apparatus of claim 10, wherein the second depth map is generated on the fly based on the first depth map.

17. A non-transitory processor-readable medium for image processing comprising processor-readable instructions configured to cause a processor to:
- obtain a plurality of images of a scene at differing focal lengths, wherein each image shows differing portions of the scene in focus;
- obtain a first depth map associated with the plurality of images;
- obtain a second depth map associated with the plurality of images, wherein the first depth map corresponds to a first neighborhood size and the second depth map corresponds to a second neighborhood size;
- generate a composite image showing two or more portions of the scene in focus, based on the plurality of images and the first depth map; and
- generate a refocused image showing a selected portion of the scene in focus, based on the composite image and the second depth map.

18. The non-transitory processor-readable medium of claim 17, wherein the first neighborhood size is smaller than the second neighborhood size.

19. The non-transitory processor-readable medium of claim 17, further comprising instructions configured to cause the processor to:
- filter each of the plurality of captured images with a sharpness measuring filter, to generate a plurality of filtered images;
- apply a first two-dimensional pixel function based on the first neighborhood size to each image in the plurality of filtered images, to generate a first plurality depth images; and
- apply a second two-dimensional pixel function based on the second neighborhood size to each image in the plurality of filtered images, to generate a second plurality of depth images.

20. The non-transitory processor-readable medium of claim 19, wherein the first two-dimensional pixel function involves calculating a weighted average among depth values corresponding to a plurality of pixels in the first neighborhood.

21. The non-transitory processor-readable medium of claim 19, wherein the first two-dimensional pixel function involves carrying out a weighted voting scheme on depth values corresponding to pixels in the first neighborhood.

22. The non-transitory processor-readable medium of claim 19, wherein the sharpness measuring filter is a Laplacian filter.

23. The non-transitory processor-readable medium of claim 19, further comprising instructions to cause a processor to:
- obtain a maximum depth value among a first plurality of depth values corresponding to the first plurality of depth images for each pixel position, to obtain the first depth map; and
- obtain a maximum depth value among a second plurality of depth values corresponding to the second plurality of depth images for each pixel position, to obtain the second depth map.

24. The non-transitory processor-readable medium of claim 17, further comprising instructions to cause the processor to generate the second depth map on the fly based on the first depth map.

25. An apparatus for image processing, comprising:
- at least one processor configured to:
  - obtain a plurality of images of a scene at differing focal lengths, wherein each image shows differing portions of the scene in focus;
  - obtain a first depth map associated with the plurality of images;
  - obtain a second depth map associated with the plurality of images, wherein the first depth map corresponds to a first neighborhood size and the second depth map corresponds to a second neighborhood size;
  - generate a composite image showing two or more portions of the scene in focus, based on the plurality of images and the first depth map; and
  - generate a refocused image showing a selected portion of the scene in focus, based on the composite image and the second depth map; and
- a memory coupled to the at least one processor.

26. The apparatus of claim 25, wherein the first neighborhood size is smaller than the second neighborhood size.

27. The apparatus of claim 25, wherein the at least one processor is further configured to:
- filter each of the plurality of captured images with a sharpness measuring filter, to generate a plurality of filtered images;
- apply a first two-dimensional pixel function based on the first neighborhood size to each image in the plurality of filtered images to generate a first plurality depth images;
- apply a second two-dimensional pixel function based on the second neighborhood size to each image in the plurality of filtered images to generate a second plurality of depth images.

28. The apparatus of claim 27, wherein the first two-dimensional pixel function involves calculating a weighted average among depth values corresponding to a plurality of pixels in the first neighborhood.

29. The apparatus of claim 27, wherein the at least one processor is further configured to:
- obtain a maximum depth value among a first plurality of depth values corresponding to the first plurality of depth images for each pixel position; and
- obtain a maximum depth value among a second plurality of depth values corresponding to the second plurality of depth images for each pixel position.

30. The apparatus of claim 25, wherein the at least one processor is further configured to generate the second depth map on the fly based on the first depth map.

* * * * *